Oct. 10, 1933.  O. BARNACK  1,930,431
ENLARGEMENT CAMERA
Filed July 18, 1932
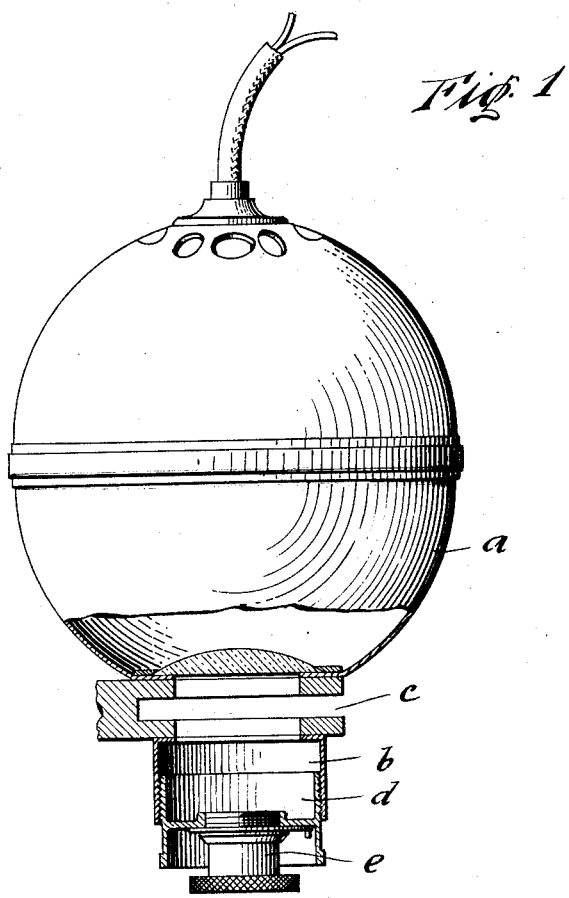
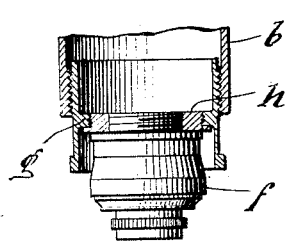
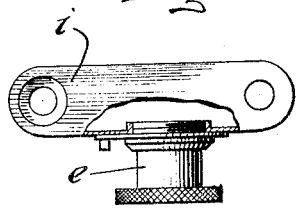
INVENTOR
Oskar Barnack
BY
George C. Heinrich
ATTORNEY Patented Oct. 10, 1933

1,930,431

UNITED STATES PATENT OFFICE 1,930,431

ENLARGEMENT CAMERA

Oskar Barnack, Wetzlar, Germany, assignor to Ernst Leitz Optische Werke, G. m. b. H., Wetzlar, Germany Application July 18, 1932, Serial No. 623,037, and in Germany December 11, 1931

1 Claim. (Cl. 88—24)

This invention relates to improvements in roll film cameras, particularly in cameras for making enlargements, and it is the principal object of my invention to provide an objective setting for such enlargement cameras with a threaded part suitable for the attachment of an objective of other cameras preferably cameras taking smaller pictures necessitating an enlargement of the pictures taken therewith.

It is a well known fact that pictures taken with very small, as for instance baby cameras, must in the most instances be enlarged, and the owner of such a small camera is, therefore, compelled to use an enlargement apparatus which eventually will increase his expenses considerably.

In order to overcome this disadvantage I have invented an enlargement apparatus, without objective, but provided with a threaded setting into which any objective of a camera used for taking the picture may be secured.

My invention furthermore, comprises the provision of a special ring for the objective setting adapted to receive and hold any objective of another roll film camera.

These and other objects and advantages of my invention will become more fully known, as the description thereof proceeds, and will then be more specifically defined in the appended claim.

In the accompanying drawing forming a material part of this disclosure:

Fig. 1 is a sectional elevation of an enlargement camera constructed according to my invention.

Fig. 2 illustrates a small camera and its objective adapted to be fitted to the enlargement camera.

Fig. 3 is a fragmentary sectional view of the front part of the enlargement apparatus.

As illustrated, an enlargement apparatus $a$ having a threaded extension $b$ in front of the picture receiver or stage $c$, and in said extension $b$ a threaded setting $d$ is arranged adapted to secure the threaded setting $e$ of an objective $f$ of a roll film camera of small calibre. The enlargement apparatus is provided with a threaded setting $g$ for the reception of a special threaded ring $h$ the thread of which corresponds to the thread of the objective $f$ of a small roll film camera $i$.

In use, the objective $e$ of the small roll film camera $i$ can readily be secured to the threaded setting $d$ or the ring $g$ of the enlargement apparatus so as to avoid the employ of a special enlargement apparatus for each small camera.

It will be understood that I have described and shown the preferred form of my invention as one example only of the many possible ways to practically construct the same, and that I may make such changes in the construction of the minor parts thereof, as come within the scope of the appended claim without departure from the spirit of my invention and the principles involved.

Having thus described my invention what I claim as new and desire to secure by Letters Patent is:

In an enlargement camera having no objective of its own, a threaded extension, in front of the picture stage of said camera, a threaded objective setting screwed into said extension, an inner threaded flange on said objective setting and an exchangeable threaded ring adapted to engage said flange and having an inner thread corresponding to the thread of an objective of a picture taking camera.

OSKAR BARNACK.